United States Patent
Yi

(10) Patent No.: US 9,986,523 B2
(45) Date of Patent: May 29, 2018

(54) METHOD AND APPARATUS FOR PERFORMING SYNCHRONIZATION BY A CELL BASED ON NETWORK LISTENING

(71) Applicant: LG ELECTRONICS INC., Seoul (KR)

(72) Inventor: Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 48 days.

(21) Appl. No.: 15/036,852

(22) PCT Filed: Nov. 20, 2014

(86) PCT No.: PCT/KR2014/011201
§ 371 (c)(1),
(2) Date: May 16, 2016

(87) PCT Pub. No.: WO2015/076585
PCT Pub. Date: May 28, 2015

(65) Prior Publication Data
US 2016/0302167 A1 Oct. 13, 2016

Related U.S. Application Data

(60) Provisional application No. 61/906,879, filed on Nov. 20, 2013, provisional application No. 61/928,427, (Continued)

(51) Int. Cl.
*H04W 56/00* (2009.01)
*H04W 16/32* (2009.01)
(Continued)

(52) U.S. Cl.
CPC ...... *H04W 56/0015* (2013.01); *H04B 7/0413* (2013.01); *H04L 5/001* (2013.01);
(Continued)

(58) Field of Classification Search
CPC .............. H04W 56/00; H04W 56/001; H04W 56/0015; H04W 72/1263; H04W 84/045; H04L 5/001; H04B 7/0413
See application file for complete search history.

(56) References Cited

U.S. PATENT DOCUMENTS

2007/0201591 A1 8/2007 Knerr et al.
2010/0074180 A1* 3/2010 Palanki ............ H04W 56/0015
370/328
(Continued)

FOREIGN PATENT DOCUMENTS

WO WO 2013/166193 A1 11/2013

OTHER PUBLICATIONS

3GPP, "3rd Generation Partnership Project; Technical Specification Group Radio Access Network; Evolved Universal Terrestrial Radio Access (E-UTRA); TDD Home eNode B (HeNB) Radio Frequency (RF) requirements analysis (Release 9)," 3GPP TR 36.922 v9.1.0, Jun. 2010, pp. 1-73.
(Continued)

*Primary Examiner* — Asad Nawaz
*Assistant Examiner* — Saad A Waqas
(74) *Attorney, Agent, or Firm* — Birch, Stewart, Kolasch & Birch, LLP

(57) ABSTRACT

The method and apparatus for synchronization are provided. The method thereof comprises receiving signal for synchronization from a source cell, performing synchronization to the source cell based on system information and/or a reference signal for synchronization and receiving and/or transmitting data at a timing based on the synchronization, wherein the reference signal is received via air interface.

11 Claims, 12 Drawing Sheets

Related U.S. Application Data filed on Jan. 17, 2014, provisional application No. 61/932,239, filed on Jan. 27, 2014, provisional application No. 61/944,047, filed on Feb. 24, 2014, provisional application No. 61/990,656, filed on May 8, 2014.

(51) Int. Cl.
*H04B 7/0413* (2017.01)
*H04L 5/00* (2006.01)
*H04W 72/12* (2009.01)
*H04W 84/04* (2009.01)

(52) U.S. Cl.
CPC ........... *H04W 16/32* (2013.01); *H04W 56/00* (2013.01); *H04W 56/001* (2013.01); *H04W 72/1263* (2013.01); *H04W 84/045* (2013.01)

(56) References Cited

U.S. PATENT DOCUMENTS

| | | | | |
|---|---|---|---|---|
| 2010/0110983 | A1* | 5/2010 | Fu | H04J 11/0056 370/328 |
| 2010/0260168 | A1* | 10/2010 | Gheorghiu | H04W 56/0015 370/350 |
| 2011/0110475 | A1* | 5/2011 | Fourcand | H04J 3/0685 375/376 |
| 2012/0224533 | A1* | 9/2012 | Lin | H04W 56/002 370/328 |
| 2013/0136057 | A1 | 5/2013 | Skov et al. | |
| 2013/0310048 | A1 | 11/2013 | Hunukumbure et al. | |
| 2014/0226541 | A1* | 8/2014 | Xu | H04W 56/0015 370/280 |
| 2014/0233524 | A1 | 8/2014 | Jang et al. | |
| 2014/0241225 | A1 | 8/2014 | Novak et al. | |
| 2015/0327043 | A1* | 11/2015 | Das | H04W 52/0206 455/418 |
| 2016/0165560 | A1* | 6/2016 | Takeda | H04W 16/32 370/350 |

OTHER PUBLICATIONS

Huawei et al., "Radio-interface based synchronization mechanisms," 3GPP TSG RAN WG1 Meeting #74, Barcelona, Spain, R1-132893, Aug. 19-23, 2013 (downloaded by EPO Aug. 10, 2013), 8 pages.

\* cited by examiner

[Fig. 1]
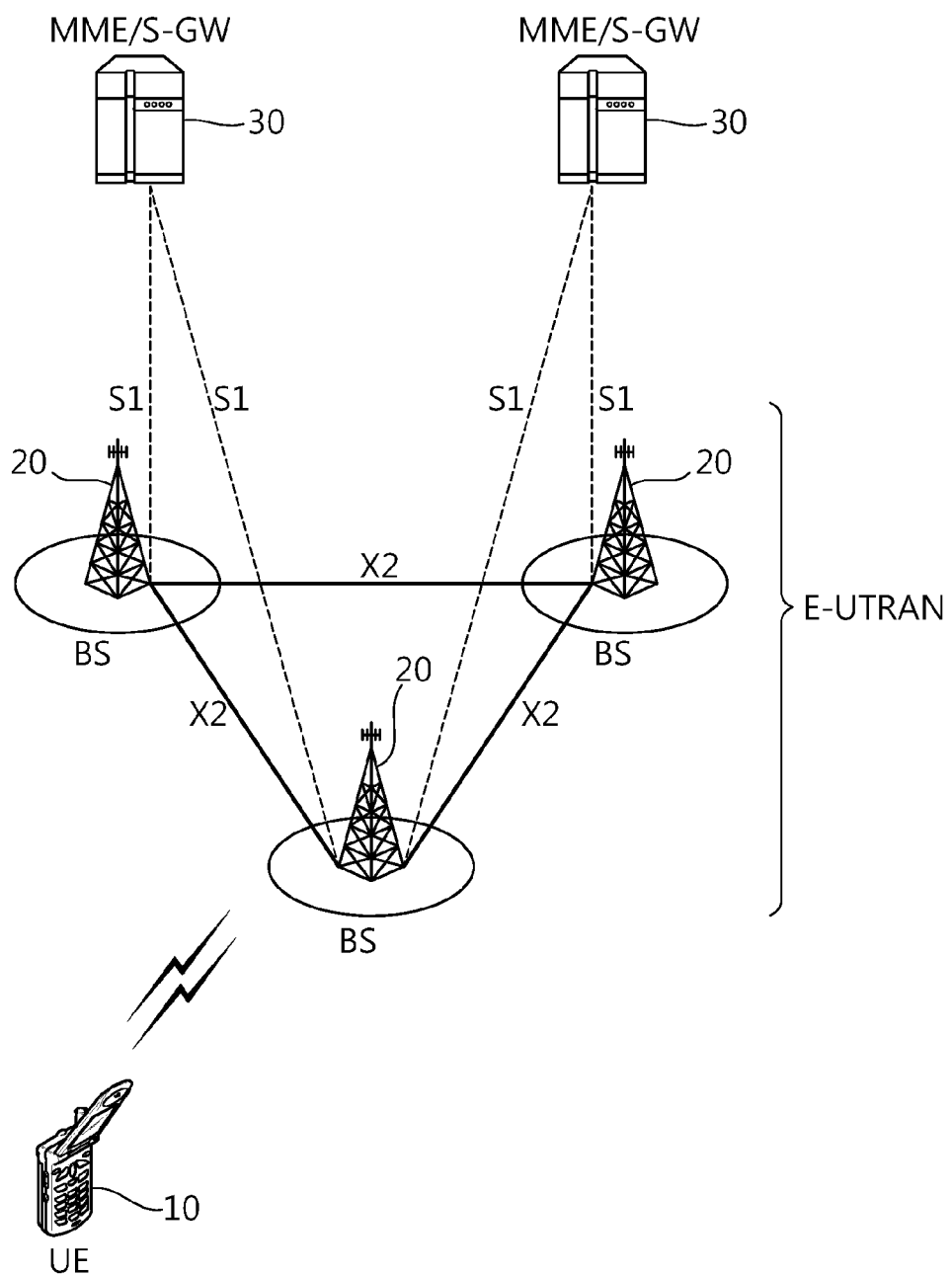

[Fig. 2]
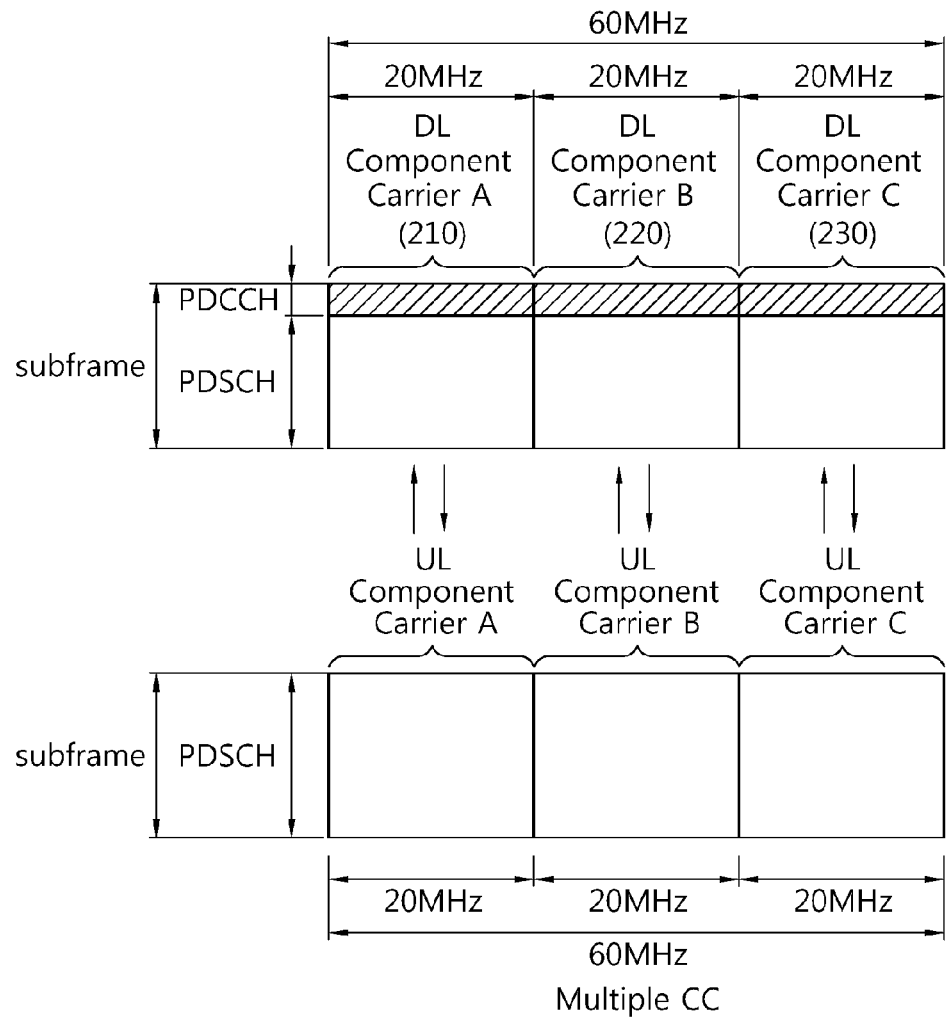
[Fig. 3]
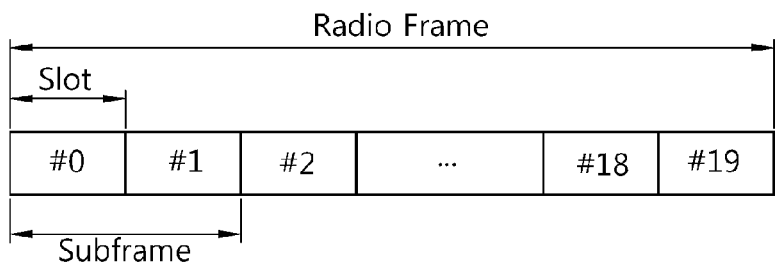

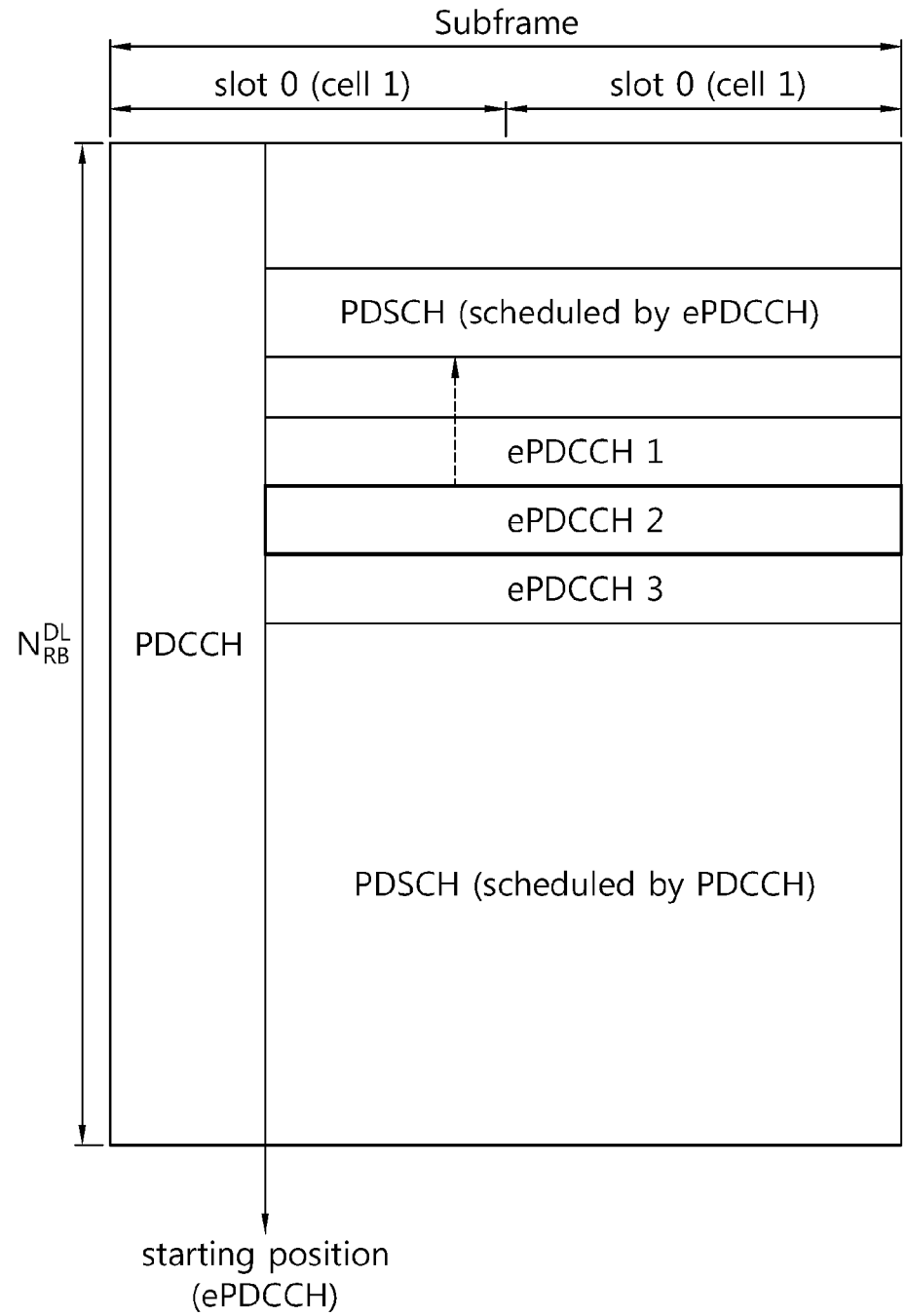
[Fig. 4]

[Fig. 5]
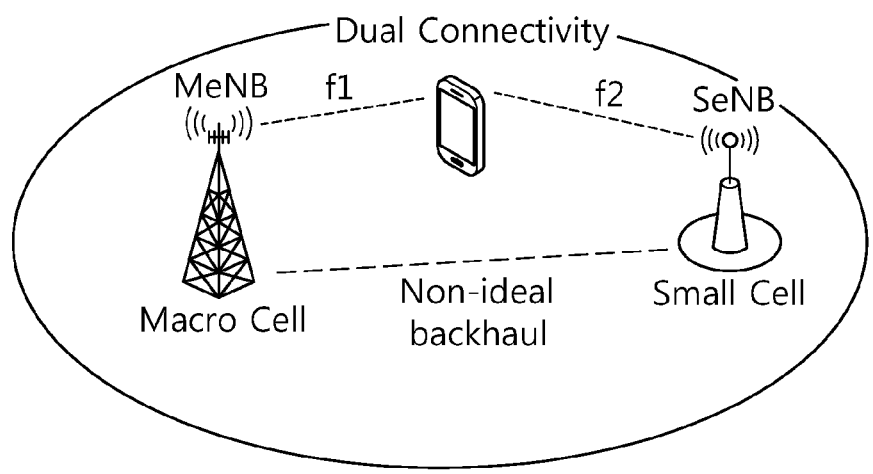

[Fig. 6]
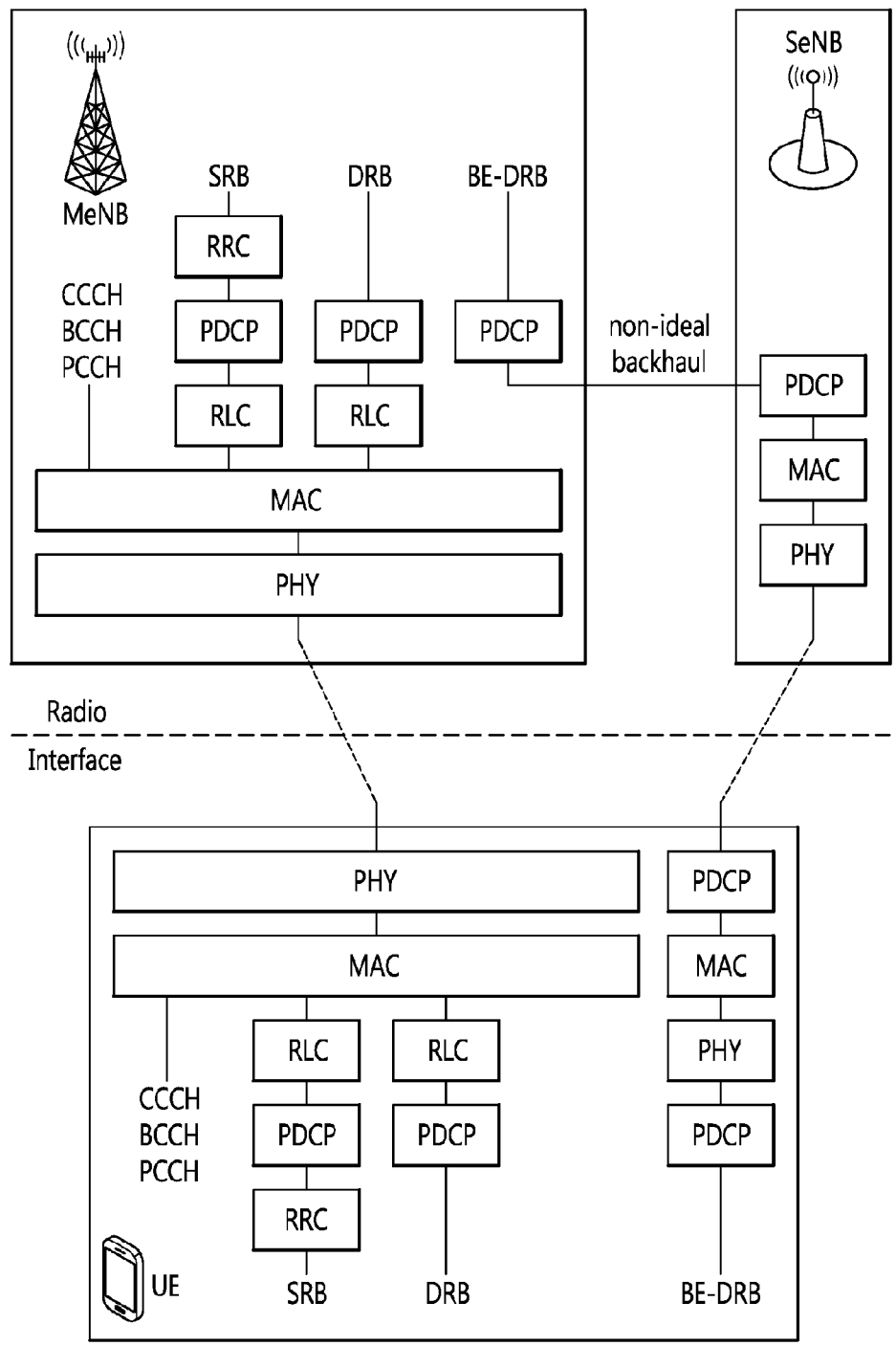

[Fig. 7]
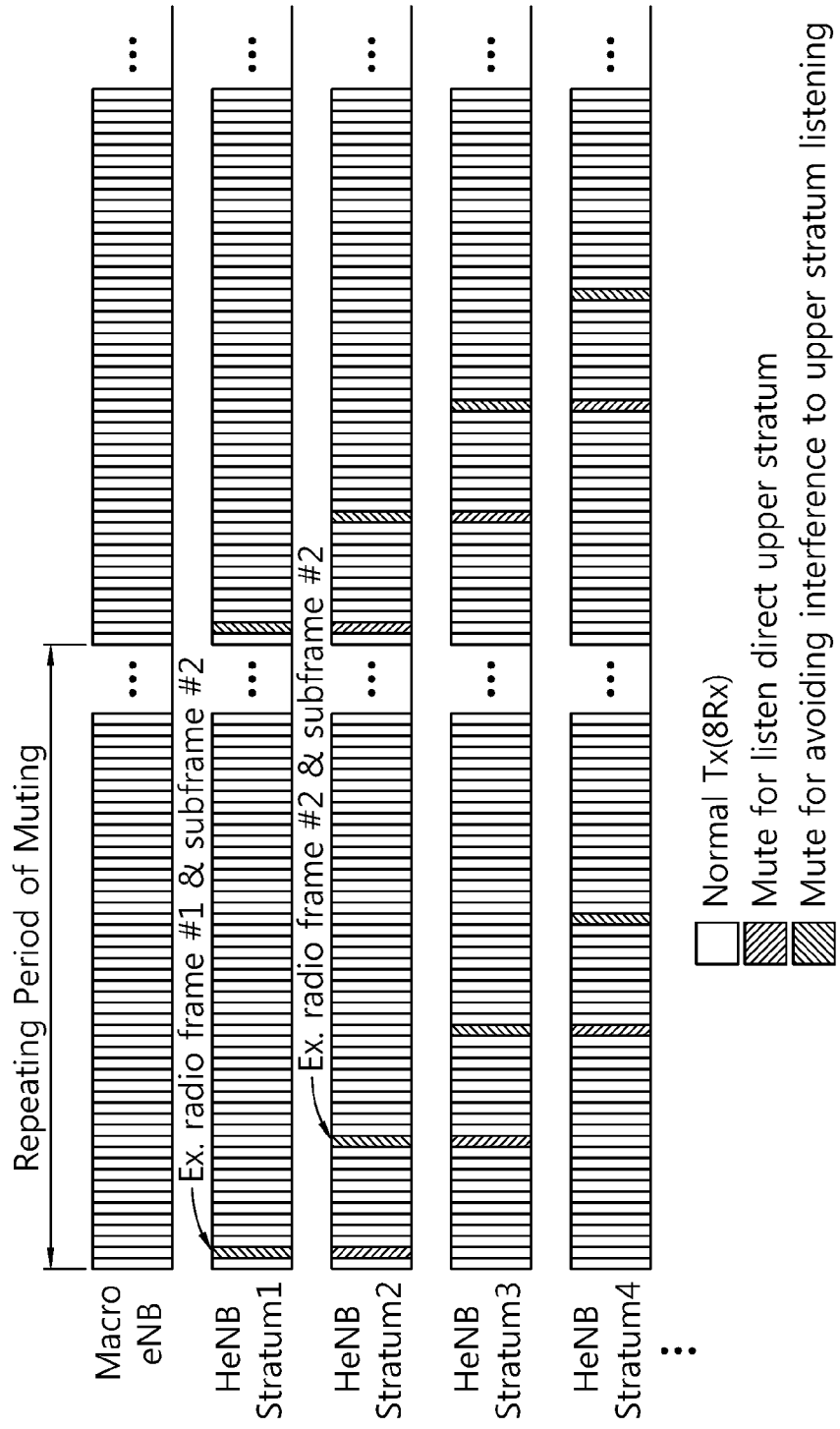

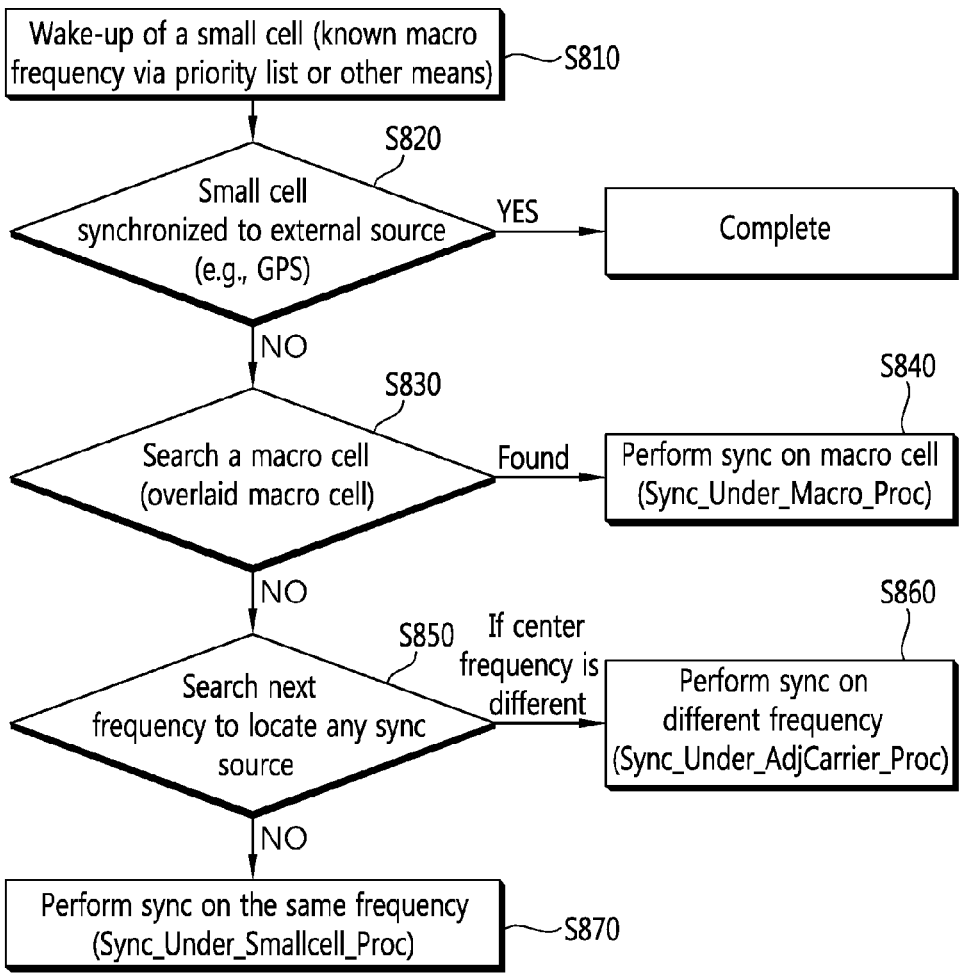
[Fig. 8]

[Fig. 9]
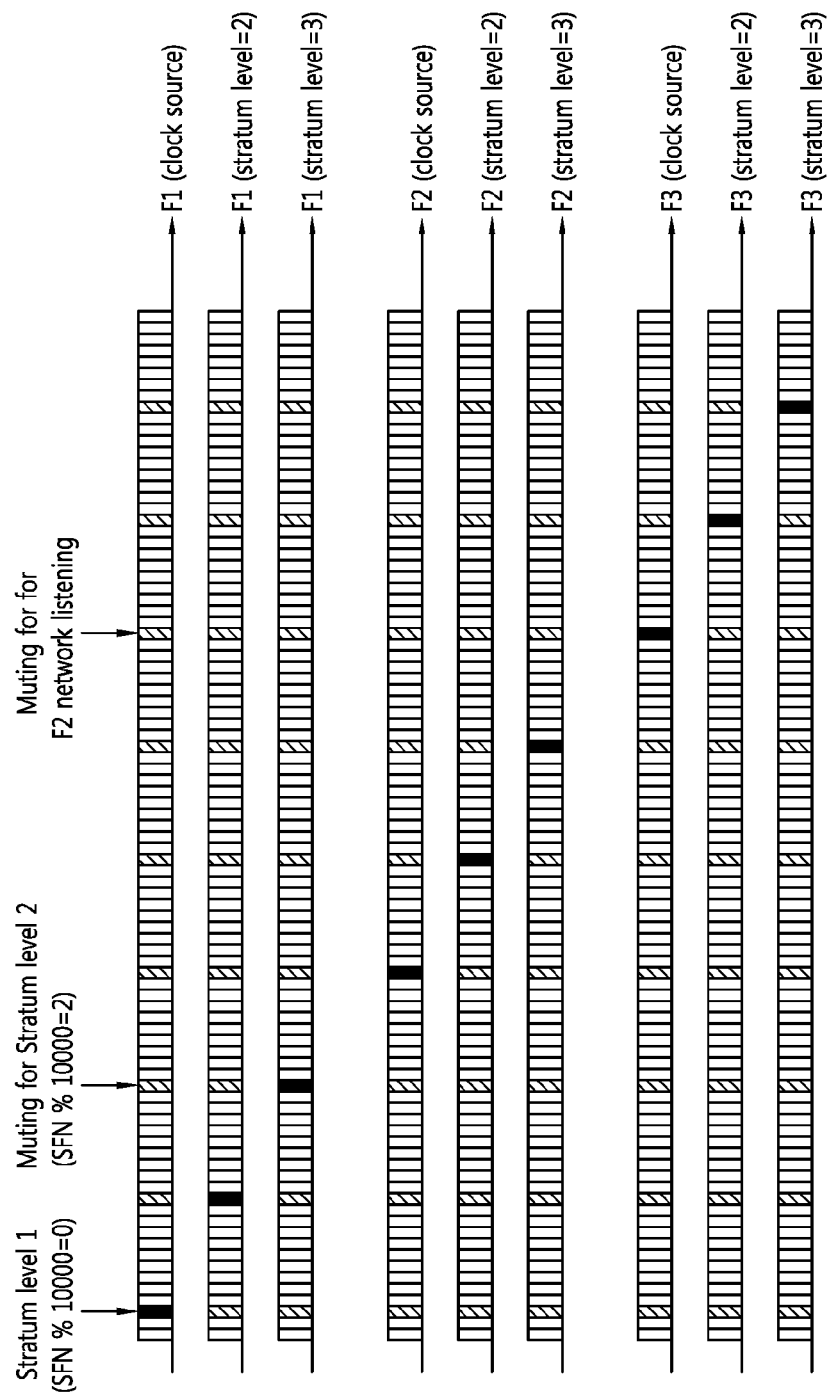

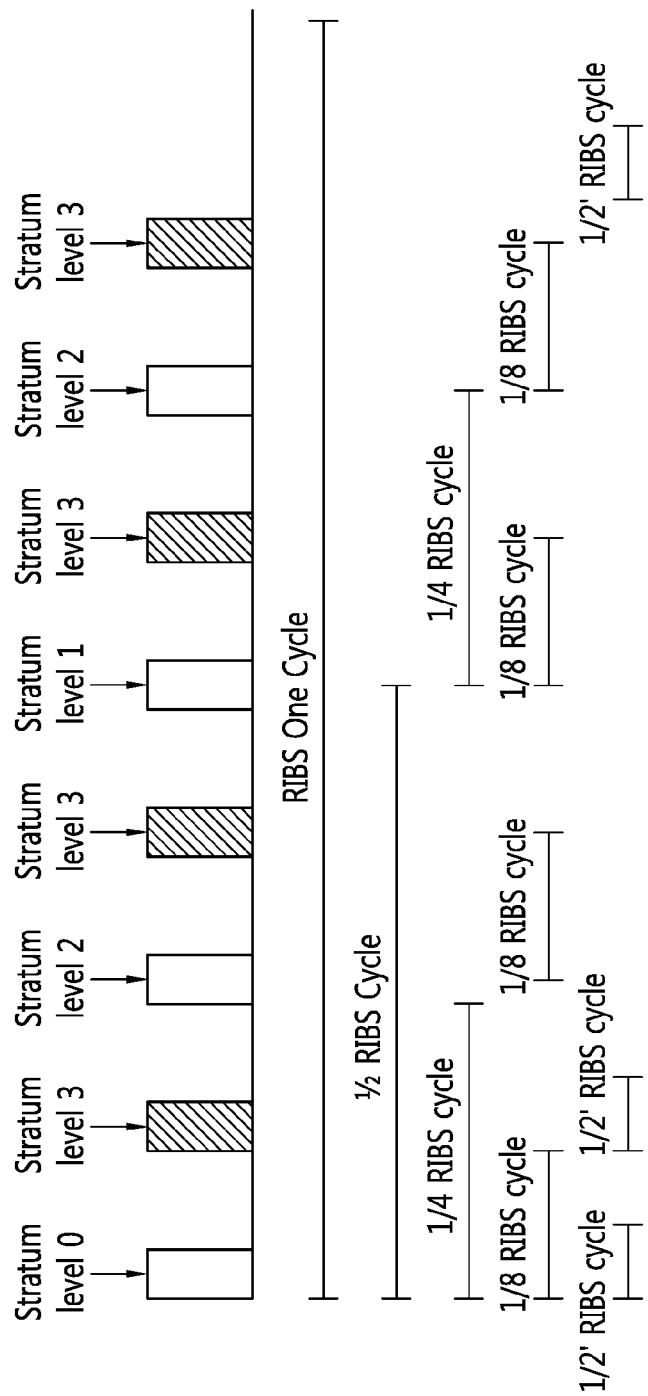
[Fig. 10]

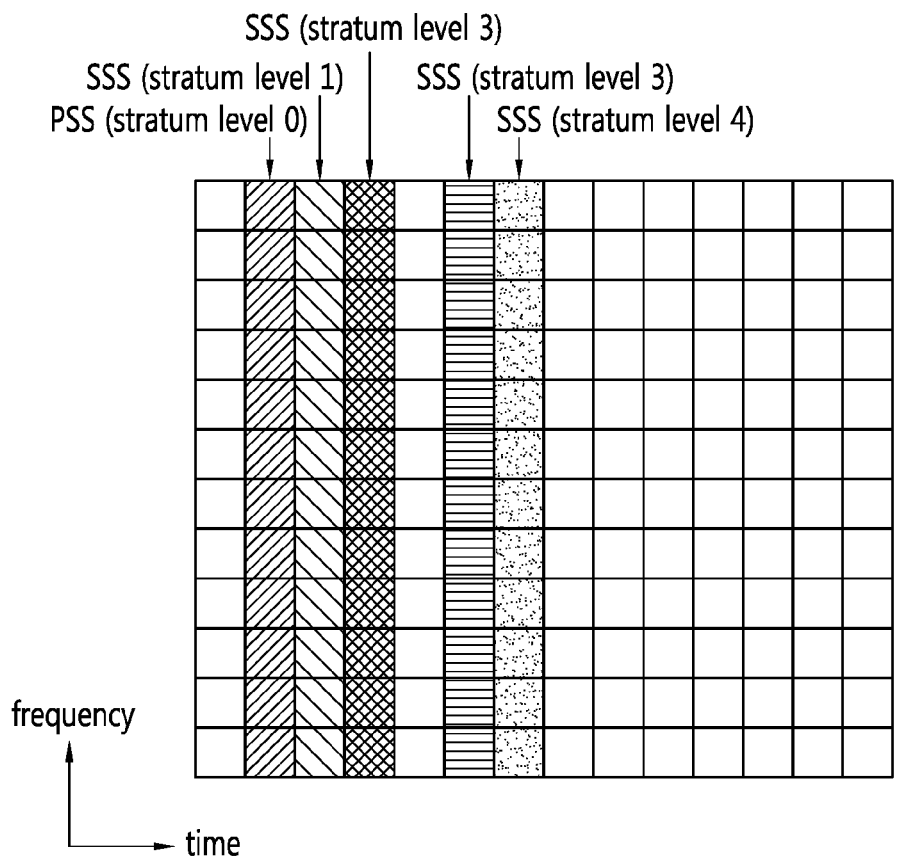
[Fig. 11]

[Fig. 12]
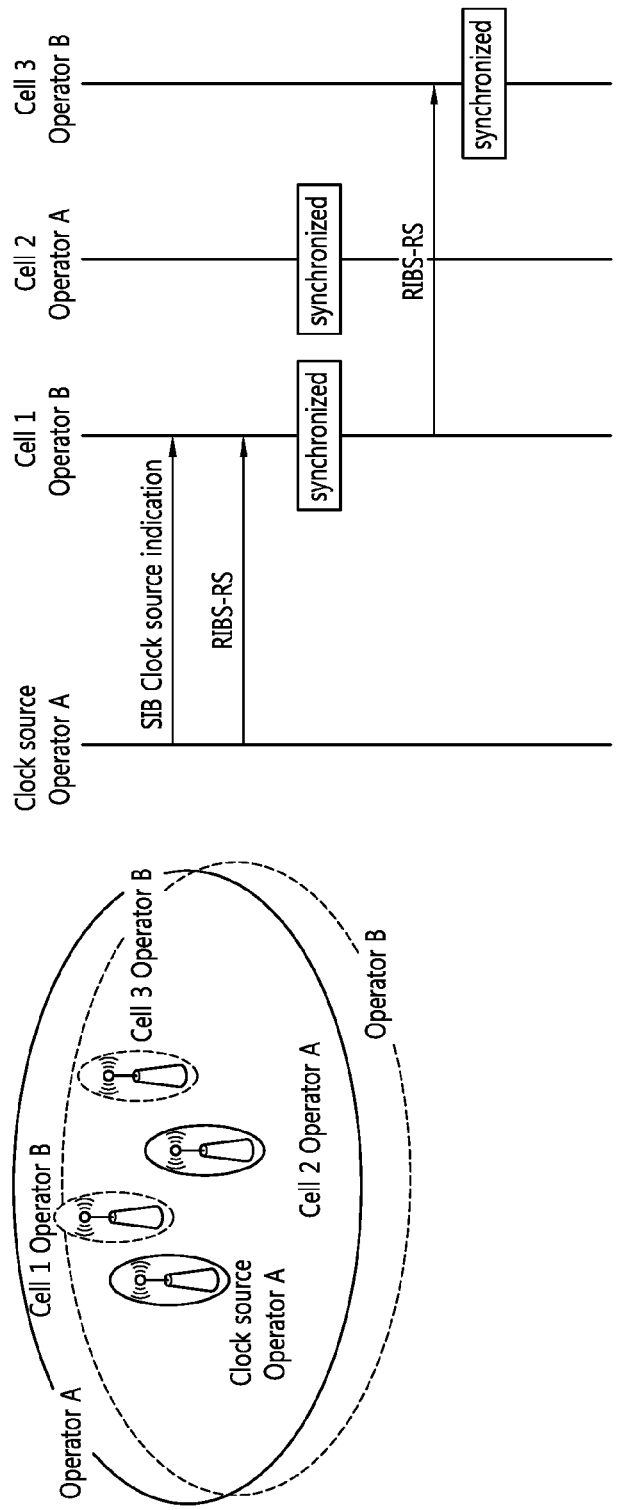

[Fig. 13]
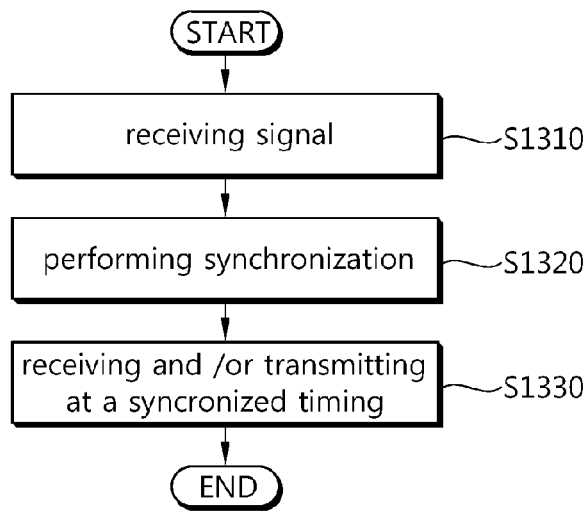
[Fig. 14]
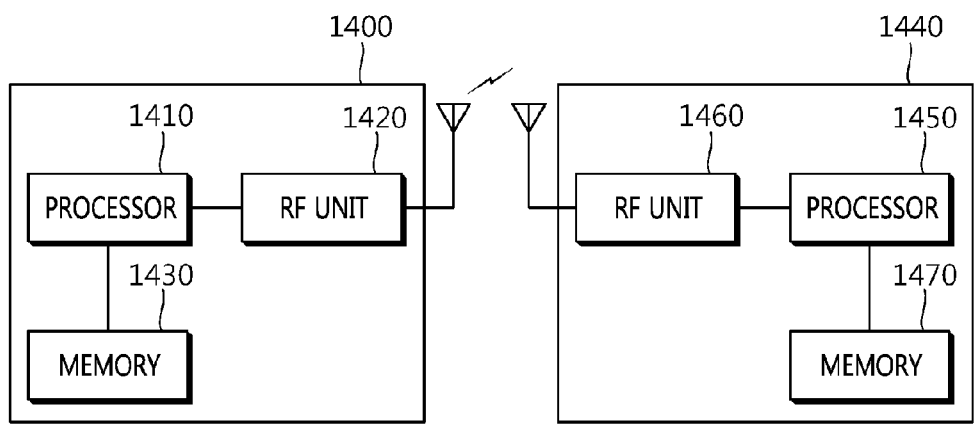

METHOD AND APPARATUS FOR PERFORMING SYNCHRONIZATION BY A CELL BASED ON NETWORK LISTENING

CROSS REFERENCE TO RELATED APPLICATIONS

This application is the National Phase of PCT/KR2014/011201 filed on Nov. 20, 2014, which claims priority under 35 U.S.C. § 119(e) to U.S. Provisional Application Nos. 61/906,879 filed on Nov. 20, 2013; 61/928,427 filed on Jan. 17, 2014; 61/932,239 filed on Jan. 27, 2014; 61/944,047 filed on Feb. 24, 2014; and 61/990,656 filed on May 8, 2014, all of which are hereby expressly incorporated by reference into the present application.

TECHNICAL FIELD

This invention relates to wireless communication, more specifically to network synchronization mechanism in small cell scenarios.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology or resource aggregation over intra-node carriers or inter-node carriers aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). For inter-node resource aggregation, for each node, carrier group (CG) can be established where one CG can have multiple CCs. Each CC is defined by a single bandwidth and a center frequency.

Recently, in addition to carriers in licensed band, carriers in unlicensed band are also considered for carrier aggregation. In this case, a UE can be configured with zero or more carriers in licensed band and zero or more carriers in unlicensed band. Due to its nature of unlicensed band where the medium is shared by multiple devices and thus continuous transmission is not easily feasible, it is very natural to assume that discontinuous transmission from an eNB operating in unlicensed band. The inventions embodied in this application are applied to carriers in unlicensed band A system in which data is transmitted and/or received in a broadband through a plurality of CCs is referred to as a multi-component carrier system (multi-CC system) or a CA environment. A system in which data is transmitted and/or received in a broadband through a plurality of CGs is referred to as a inter-node resource aggregation or dual connectivity environment. The multi-component carrier system and dual connectivity system perform both a narrow band and a broad band by using one or more carriers. For example, when an each carrier corresponds to a bandwidth of 20 MHz, a bandwidth of a maximum of 100 MHz may be supported by using five carriers.

Meanwhile, the usage of small cell is getting grown in many fields nowadays, such as pico cells, small cells under dual connectivity, etc. In these many cases, concerning synchronize between cells also become to be an issue.

SUMMARY OF INVENTION

Technical Problem

An object of the present invention is to provide method and apparatus for network synchronization of small cell using network listening in inter-operator scenario. Another object of the present invention is to provide method and apparatus for network synchronization considering stratum level of cells.

Another object of the present invention is to provide method and apparatus for network synchronization using system information and/or signal via air interface.

Solution to Problem

An embodiment of the present invention is a method for performing synchronization by a cell based on network listening. This method comprises receiving signal for synchronization from a source cell, performing synchronization to the source cell based on system information and/or a reference signal for synchronization and receiving and/or transmitting data at a timing based on the synchronization, wherein the reference signal is received via air interface.

Another embodiment of the present invention is an apparatus for performing synchronization based on network listening. This apparatus comprises a radio frequency (RF) unit for transmitting and receiving a radio signal, and a processor operatively coupled to the RF unit, wherein the processor is configured for transmitting signals via the RF unit based on a scheduling for UL and/or DL, wherein the processor performs synchronization to source cell based on a reference signal for synchronization and/or system information, wherein the RF unit received via air interface.

Advantageous Effects of Invention

According to the present invention, small cells can perform synchronization without backhaul signaling.

According to the present invention, network synchronization can be performed considering an accuracy of synchronization signal including predetermined reference signal.

According to the present invention, efficiency of network can be enhanced by repeated signaling in consideration of accuracy level i.e., stratum level.

BRIEF DESCRIPTION OF DRAWINGS

FIG. 1 shows a wireless communication system to which the present invention is applied.

FIG. 2 shows an exemplary concept for a carrier aggregation (CA) technology according to an exemplary embodiment of the present invention.

FIG. 3 shows a structure of a radio frame to which the present invention is applied.

FIG. 4 shows downlink control channels to which the present invention is applied.

FIG. 5 shows an example of dual connectivity to a macro cell and a small cell.

FIG. 6 shows an example of a protocol architecture supporting dual connectivity.

FIG. 7 briefly describes an example of muting pattern per stratum level.

FIG. 8 is a flow chart briefly showing procedure of small cell synchronization via network listening.

FIG. 9 is an example of downlink/uplink configuration in TDD.

FIG. 10 briefly describes an example of RS transmission point based on the stratum level.

FIG. 11 briefly shows an example of the gap between synchronization signals which can be used for stratum level.

FIG. 12 briefly describes an example of synchronization procedure explained above.

FIG. 13 is a flow chart briefly describing the operation of the inventions.

FIG. 14 is a block diagram which briefly describes a wireless communication system.

MODE FOR THE INVENTION

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to an user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) are explained. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface. Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

FIG. 2 shows an exemplary concept for a carrier aggregation (CA) technology according to an exemplary embodiment of the present invention.

Referring to FIG. 2, the downlink (DL)/uplink (UL) subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a PCell (primary serving cell) is a resource in which the UE initially establishes a connection (or a RRC connection) among several serving cells. The PCell serves as a connection (or RRC connection) for signaling with respect to a plurality of cells (CCs), and is a special CC for managing UE context which is connection information related to the UE. Further, when the PCell (PCC) establishes the connection with the UE and thus is in an RRC connected mode, the PCC always exists in an activation state. A SCell (secondary serving cell) is a resource assigned to the UE other than the PCell (PCC). The SCell is an extended carrier for additional resource assignment, etc., in addition to the PCC, and can be divided into an activation state and a deactivation state. The SCell is initially in the deactivation state. If the SCell is deactivated, it includes not transmit sounding reference signal (SRS) on the SCell, not report channel-quality indicator (CQI)/precoding matrix indicator (PMI)/rank indicator (RI)/procedure transaction identifier (PTI) for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARM). That is, ACK/NACK signals for uplink data that has been transmitted by a UE are transmitted on a PHICH.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUCCH) that carries user data is allocated in the frequency domain.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a channel quality indication (CQI), and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system. PUCCH format 3 can be used to enable the possibility of transmitting more than four bits in an efficient way, even though PUCCH format 3 also be used for transmitting less four bits of signal. The basis of PUCCH format 3 is DFT (Discrete Fourier Transform)-precoded OFDM. Up to five terminals may share the same resource-block pair for PUCCH format 3 when a length-5 orthogonal sequence is used with each of the five OFDM symbol carrying data in a slot being multiplied by one element of the sequence. A terminal (eNB and/or UE) can be configured with more than one resource (e.g. four different resources) for PUCCH format 3.

Herein, an ePDCCH can be one of solutions of limitation for a PDCCH transmission or new control information transmission of near future communication system including a new type of carrier as shown in FIG. 4.

FIG. 4 shows downlink control channels to which the present invention is applied. The ePDCCH which can be multiplexed with the PDSCH can support multiple Scells of the CA.

Referring to FIG. 4, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in multimedia broadcast single frequency network (MBSFN) subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where a cell-specific common reference signal (CRS) may be omitted in some subframes or physical broadcast channel (PBCH) may not be transmitted.

FIG. 5 shows an example of dual connectivity to a macro cell and a small cell. Referring to FIG. 5, the UE is connected to both the macro cell and the small cell. A macro cell eNB serving the macro cell may be called as a MeNB in dual connectivity, and a small cell eNB serving the small cell may be called as a SeNB in dual connectivity.

The MeNB is an eNB which terminates at least S1-MME and therefore act as mobility anchor towards the core network (CN) in dual connectivity. If a macro eNB exists, the macro eNB may function as the MeNB, generally. The SeNB is an eNB providing additional radio resources for the UE, which is not the MeNB, in dual connectivity. The SeNB may be generally configured for transmitting best effort (BE) type traffic, while the MeNB may be responsible for transmitting other types of traffic such as VoIP, streaming data, or signaling data.

FIG. 6 shows an example of a protocol architecture supporting dual connectivity. To support dual connectivity, various protocol architectures have been studied.

Referring to FIG. 6, PDCP and RLC entities are located in different network nodes, i.e., PDCP entities in the MeNB and RLC entities in the SeNB. In the UE side, the protocol architecture is same as the prior art except that the MAC entity is setup for each eNB (i.e., the MeNB and SeNB).

Meanwhile, network listening is a useful technique which can be utilized when other techniques such as GPS or IEEE 1588v2 are not available.

Inventions in disclosure reviews a set of scenarios where network listening may be applied and propose enhancement in backhaul signaling to support efficient network listening mechanisms.

For example, the invention(s) in this disclosure focuses on coordinated muting technique using MBSFN subframe as described in 3GPP TR 36.922. An example of coordinated muting/transmission pattern is shown in below. In coordinated muting, following a pattern, each small cell transmits RS for network listening and others will do muting to reduce interference.

The invention(s) in this disclosure also focuses on time synchronization aspect. Yet, the techniques proposed in this invention can be applicable for frequency synchronization as well.

Hereinafter, detailed descriptions for the invention(s) relating to the network listening are provided with figures.

Reference Signal (RS) Candidates Used for Network Listening

When coordinated muting is applied, in terms of transmitting RS for network listening and perform muting may be realized in two approaches.

In first approach, only muting is concerned i.e., eNBs may perform muting of RS transmission which otherwise may interfere the RS transmission from the transmitters for network synchronization for a given stratum level and transmitter may transmit regular signals which can be read by UEs and other eNBs at the same time.

The stratum level can be used by other nodes to calculate its timing accuracy compared to the clock source. Alternatively, stratum level may be used for indicating accuracy level as well. For example, accuracy level 3 maps to stratum level 3 and accuracy level 2 maps to stratum level 2 and so on. Thus, the lower stratum level may have the more accuracy. In addition, the cell with high stratum level may listen to RS of the cell with low stratum level. For example, the cell with k-th stratum level (k is integer and 0≤k) may perform network synchronization with RS transmitted from a cell with (k−1)-th stratum level.

How to determine stratum level may be up to eNB implementation. Yet, the mapping table where each eNB can assume in terms of synchronization error achievable needs to be specified. This specification is necessary to determine the state of synchronous or asynchronous if there is a target requirement to meet. Table 1 is an example of accuracy mapping table.

TABLE 1

| Accuracy Level | |
|---|---|
| 0 | Clock source (less than ~100 ns) Synchronous |
| 1 | Accuracy within ±1 us Synchronous |
| 2 | Accuracy within ±1.5 us Synchronous |
| 3 | Accuracy within ±3 us Synchronous |
| 4 | Accuracy within ±6 us Asynchronous |
| 5 | Accuracy within >=±10 us Asynchronous |

The other approach is to determine both transmission and reception occurrence by the muting/transmission pattern. In other words, based on a pattern, each eNB will perform transmission and reception regardless of whether the transmitted signals may be read by UEs or not. In this case, each synchronization source and target may determine its own transmission and muting pattern which can be exchanged via backhaul signaling. For example, source eNB may indicate the set of subframes and/or period/offset of synchronization signal transmission which can be informed to the target eNB via backhaul signaling.

FIG. 7 briefly describes an example of muting pattern per stratum level. Referring to the FIG. 7, each stratum has its own pattern or muting timing. A set of eNBs may use the same muting pattern if it has the same stratum level.

One example of second approach is to configure both subframes for transmission and reception (transmission and muting places) as MBSFN subframes or uplink subframes to minimize the impact on UEs. To allow flexibility, it may be assumed that RS transmitted in OFDM symbols except for first two OFDM symbols (to allow PDCCH transmission in MBSFN subframes) are used for network listening. Different scrambling or sequence, if transmitted in MBSFN or uplink subframes, for synchronization RS may be feasible as well.

One example of the second approach is to use the same ID to scramble the RS per stratum-level. In other words, RS transmitted from eNBs with stratum level 1 may use the same ID as well as the same location (i.e., SFN transmission of RS) to further enhance the performance.

The ID and/or resource configurations used for each stratum level may be preconfigured via Operations and Maintenance (OAM) or configured by macro cell or controlling eNB. In addition to CRS, channel-state information reference signal (CSI-RS) or primary synchronization signal (PSS)/secondary synchronization signal (SSS) or PSS or SSS or PRA (Positioning RS) may be considered if second approach is used.

Even with first approach, synchronization may be performed based on any available signals at the transmission places. For example, if transmission occurs in subframe #0, in addition to CRS, PSS/SSS may be also usable for network listening. Furthermore, which RS(s) can be used for synchronization can be indicated via backhaul signaling. One example is to use PSS/SSS+CRS or CRS+PRS.

In either approach, the following candidates using existing signals or combinations of existing signals can be considered such as (1)~(5) as below.

(1) CRS: If CRS is used for network listening RS, depending on MBSFN subframe configuration of transmitter eNB, the transmitting subframe may carry CRS in first two OFDM symbols or the entire subframe. In first two OFDM symbols, however, other eNBs may not be able to mute as it needs to transmit PDCCH in MBSFN subframes configured for muting places (unless the subframe is configured as uplink subframe). With this point, hearing ability of CRS in first two OFDM symbols even with coordinated muting may not be desirable. Thus, it would be better to consider CRS transmission in OFDM symbols other than first two OFDM symbols.

If the subframe is normal subframe and eNB transmits CRS in that subframe, this can be achieved without any additional support. If the subframe is however configured as MBSFN subframe, CRS needs to be transmitted in PDSCH region or MBMS region.

(2) CSI-RS: Another RS can be used for network listening is CSI-RS. To allow large interval between synchronization RS transmission occurrences, a new configuration with larger gap may be necessary.

(3) Primary synchronization signal (PSS) and/or secondary synchronization signal (SSS): To avoid potential confusion at UE side, if PSS and/or SSS are used for synchronization signal, it would be desirable to transmit either PSS or SSS. Another possible approach is to use different gap from current gap for FDD or TDD in normal/extended Cyclic Prefix between PSS and SSS transmission such that a UE cannot successfully decode both PSS and SSS.

(4) DM-RS: DM-RS can be also considered as RS for network listening.

(5) MBSFN-RS: If uplink subframe or MBSFN subframe is used for network listening, MBSFN-RS can be considered for network listening purpose.

(6) PRS: PRS can be used for synchronization as well in which case, a UE may not be known whether the network is transmitting PRS or not. To minimize the impact on UE, data scheduling may not be scheduled in that subframe where PRS for network synchronization is transmitted.

To achieve better synchronization, it is desirable to listen on PSS/SSS and CRS transmission from a source cell. Using MBSFN based coordinated muting, however, this is not easily achievable unless the cell which is listening skips transmitting of PSS/SSS/CRS at subframes of listening.

Moreover, the quality of PSS/SSS and CRS (e.g., in subframe #0) may not be good due to high interference from other cells when network synchronization is used.

Thus, it may not be desirable to listen on other cells in subframe #0/subframe #5 though listening on PSS/SSS may be useful. To mitigate this issue, one method is to transmit PSS and/or SSS in subframe used for transmitting RS for network listening and then avoid scheduling data in those region where this additional PSS and/or SSS is transmitted. To support this, transmitter also may claim the subframe as MBSFN subframe, and then avoid scheduling of PDSCH in center 6 PRB to transmit other signals.

Depending on scenarios, the best candidate for network listening can be different. For example, if overlaid macro layer is used for network listening, CRS/PSS/SSS would be the best candidate whereas small cell is used for network listening source, CSI-RS or MBSFN-RS can be considered.

Thus, along with coordinated muting pattern, the type of RS(s) can be also configured. Or, if CSI-RS is used, the configuration of CSI-RS used for network listening may be indicated via signaling or OAM.

RS Locations Used for Network Listening

Without knowing the system bandwidth, it would be reasonable to assume that RS transmitted in center 6 PRB will be used for network listening. Or, it may be assumed that listening cell may acquire the system bandwidth information of source cell and try to locate synchronization RS in the entire system bandwidth.

Particularly, if a small cell acquires synchronization RS from a neighbor small cell in the same frequency, it may be assumed that the same system bandwidth is used for all small cells in the same frequency.

This however would be effective only when synchronization RS transmitted by source cell would be used for both network listening as well as serving UEs (i.e., UEs can read RS as well).

If separate RS which may not be readable from a UE perspective is used for network listening, it would be desirable to limit the number of PRBs transmitting RS. The location of PRBs can be configurable by signaling or predetermined via OAM.

In terms of a candidate procedure how network listening can work when a small cell is booted up FIG. 8 is a flow chart briefly showing procedure of small cell synchronization via network listening.

Referring to FIG. 8, a small cell wakes up with macro frequency (S810). The macro frequency is known via priority list or by other mean such as direct signaling.

When the small cell wakes up, the small cell synchronizes with external source (S820). The small cell identifies synchronization source per preconfigured priority list of frequency to look up. It may be assumed that first the small cell will search macro frequency to locate overlaid macro layer. When macro cell is detected, it can further determine whether it uses macro cell for frequency and/or time synchronization. One criteria is to use pathloss estimation to infer the expected propagation delay between macro and the small cell.

If the pathloss exceeds a certain threshold, it may consider time synchronization using macro cell may not be adequate in terms of performance. However, frequency tracking may be considered as adequate. In that case, time and frequency tracking may use separate synchronization source.

And then, necessary synchronization procedure may continue to perform time synchronization. To support this, transmission power of macro cell may be indicated to the small cells either via signaling or small cell may read SIB information of macro cell.

When the small cell wakes up, the small cell first searches macro cell either via air-interface or discover macro cell via other signaling (S830). When the small cell which has not acquired network synchronization from external source such as GPS, the small cell first searches macro cell or controlling eNB. It may be assumed that the IP address of overlaid macro cell or controlling eNB is known to the small cell via OAM if macro cell is discovered by backhaul signaling. If air-interface discovery is used, small cell listens to the macro layer frequency to identify a macro cell. It can be assumed that the frequency to search macro cells can be preconfigured via OAM. Upon detecting multiple macro cells, via signaling, small cell may determine which macro cell is an overlaid macro cell or controlling eNB. To support this, either a macro cell may advertise a list of small cell IDs that the macro cell is in charge of or the macro cell may advertise a list of small cell cluster IDs that the macro cell is in charge of. By matching either ID, a small cell can determine which macro cell is an overlaid macro cell to perform network synchronization.

If this information is known, this information can be used to determine a right source cell. Or, a small cell simply determines an overlaid macro cell based on measurement such as reference signal received power (RSRP), in other words, a macro with acceptable or highest RSRP is considered as an overlaid macro cell.

Assuming a small cell listens stratum-0 RS where a list of cell IDs which are stratum-0 are known to the small cell via signaling or via OAM configuration, a small cell may choose a cell with a macro cell which is an overlaid macro cell and also signal-to-interference-plus-noise ratio (SINR) of RS from the cell exceeds a certain threshold.

To consider a case where two eNBs with same stratum level may transmit RS in the same subframe and thus collide, coordinated muting pattern may configure more than one subframes or frequencies to allow further orthogonality. Or, each eNB depending on discovered collision cases (if neighbor eNB reports the collision or high interference level at certain stratum level) may determine to skip or mute in some subframes even though those subframes are configured as the target stratum level that the given eNB is acquired to minimize the interference. Or, dynamic reconfiguration of coordinated muting pattern may be considered by overlaid macro or cluster master. To aid the reconfiguration, interference condition may be triggered or reported by eNBs.

Anyway, when a macro cell is detected/determined with the macro frequency, the small perform synchronization on the detected macro cell (S840). For the synchronization, the information such as Sync_Under_Macro_Proc may be used. It will be described later.

When a macro cell is not detected with the macro frequency, the small cell searches next frequency to locate any synchronization source (S850). If center frequency is different, the small cell performs synchronization on different frequency (S860). If center frequency is same, the small cell performs synchronization on the same frequency (S870). In this case, the information such as Sync_Under_SmallCell_Proc may be used.

Here, detailed descriptions on the three synchronizations in the example of FIG. 8 are provided.

Procedure (Sync_Under_Macro_Proc)

Once a macro cell is detected, it can be used for clock source or source cell. Assuming macro cell transmits CRS, a small cell may use PSS/SSS and/or CRS of macro cell to acquire frequency and/or time synchronization. To allow multi-hop network synchronization, macro cell may configure a coordinated muting/transmission pattern and also configure RS type and/or configuration for network listening used in small cell layer. As mentioned above, if macro cell is far from the small cell, the macro cell may be used for frequency tracking, yet time synchronization may be performed separately (or vice versa).

In other words, even with identified overlaid macro cell, a small cell may search other small cells which are clock sources (i.e., stratum level=0). If there is no clock source available in a small cell cluster, it is also considerable to choose one or more small cells used for clock sources by the macro cell. In this case, those selected small cells may acquire time synchronization from the macro cell layer as well.

Since a small cell may need to listen on different frequency to listen on macro layer, the service may be interrupted while network RS reception is performed. Those interruptions may be performed while uplink subframes (if TDD is used) or MBSFN subframes or special subframes (if TDD is used). If MBSFN subframe is used, the small cell may transmit first two OFDM symbols and switches to macro frequency (if TDD or half-duplex FDD is used) to acquire synchronization RS.

If more than one subframes is needed to acquire sync RS, it may be assumed that eNB will not transmit any signal during RS reception. Particularly, this applies for half-duplex TDD eNB. This may impact the UE performance as eNB may not transmit necessary RS in certain subframe(s), however, with infrequent RS reception, this may not cause significant performance impact.

It could be good to listen on macro cell layer on subframes where MBSFN subframe is not configured for the macro cell (i.e., good to hear normal subframes to acquire more RS receptions).

If the target eNB has additional receiver which can listen on macro or other frequency for network listening, this interruption may not be needed to be handled. Thus, indication of capability whether additional receiver is equipped or not can be signalled so that proper coordinated muting pattern can be considered.

Or, if target eNB does not have additional receiver, to minimize service interruption, the desired subframe configuration of network listening can be signalled to source eNB to make it sure that source eNB transmits radio-interface based synchronization reference signal (RIBS-RS) in those subframes.

Or, a source eNB can send the pattern where RIBS-RS will be transmitted which is handled by source eNB by proper configuration. Alternatively, preconfigured subframe configuration can be used.

FIG. 9 is an example of downlink/uplink configuration in TDD. Referring to FIG. 9, all DL/UL configurations may define subframe #2 as uplink subframe in TDD. Accordingly, subframe #2 may be used for network listening. However, this may limit the performance of uplink transmission, particularly, for DL/UL configuration 5 where only uplink subframe #2 exists. Thus, instead of subframe #2, subframe #7 can be also used which is uplink subframe in many DL/UL configurations.

Procedure (Sync_Under_AdjCarrier_Proc)

This procedure may be similar to Sync_Under_Macro_Proc in terms of behavior. Since small cell may have higher frequency error compared to macro cell, performing both time/frequency synchronization using a source cell which is a small cell may have performance limitation. And thus, higher threshold may be used to determine a source cell.

When a macro cell is not available or any other external frequency sync source is not available, eNB may select high SINR threshold when selecting a source cell. The threshold may be predetermined via OAM or configured by signaling.

However, the SINR threshold value can be different depending on the cases. Possibly, three cases may be considered, (1) time and frequency synchronization using adjacent carrier small cell, (2) time synchronization using adjacent carrier small cell with frequency tracking via other means, (3) frequency tracking using adjacent carrier small cell with time tracking via other means.

When frequency tracking is concerned, it may be necessary to know the frequency tracking performance of source cells, which may be determined based on source cell type (e.g., macro, HeNB, pico, etc) or the information may be signaled.

With lower requirement of frequency tracking in small cell eNBs (e.g., 0.5 ppm) compared to macro cell eNBs (e.g., 0.1 ppm), it is desirable to consider frequency tracking and time tracking rather separately. In other words, source cells for frequency and time tracking may be different. This applies to other procedures as well.

Procedure (Sync_Under_SmallCell_Proc)

This procedure is used for small cells in the same frequency. Assuming there are at least a few small cells which are clock sources, small cells may acquire time and/or frequency synchronization in the same frequency via potentially multi-hop. As the synchronization accuracy per hop is tightly related to the maximum hop supported, unless configured otherwise by other means, small cell may assume maximum supportable hop is '1' when time and frequency tracking is performed based on network listening with clock source which is a small cell.

The maximum hop count can be increased to '6' if only time synchronization is performed. Other values are not precluded. Per-hop-accuracy may be determined based on the maximum hop count.

Meanwhile, the case in that there is no backhaul signalling between cell for the network listening i.e., for synchronization between cells.

Network Synchronization for Inter-Operator Scenario:

For inter-operator network synchronization scenario, it may be assumed that backhaul signaling between operators are not established and thus all the necessary information needs to be exchanged via air interface.

A few issues may be considered, for example, ① how to detect "clock source" or stratum level '0' source, ② how to detect "stratum level", ③ how to detect "RIBS-RS", ④ how to detect frame boundary of source eNB, ⑤ whether to detect source cell ID, ⑥ how to detect source cell type (where it can be used for time sync only, frequency sync only or usable for both), ⑦ whether there is a need to read single frequency network (SFN) or can assume that SFN is known via network listening, etc.

From network listening perspective, unless each target eNB is equipped with additional receiver to listen on different frequency from operating frequency, service interruption occurs. Assuming TDD DL/UL configuration is same and works regardless of TDD DL/UL configuration of source eNB, only two feasible solutions are considered.

One option is to utilize uplink subframe or carrier for radio-interface based synchronization (RIBS) operation and the other option is to utilize guard period of subframe #1 which may not be affected by performing enhanced interference mitigation and traffic adaptation (eIMTA).

Utilizing guard period has its own limitation. First, it is difficult to convey stratum level unless SFN information is known to target eNB (which requires reading of PBCH of source NB). Secondly, without proper modification, due to its limited size, it may not support more than stratum level '2'. Thirdly, when source eNB actually requires long guard period, this would not be supported. Thus, utilizing guard period for inter-operator scenario seems not a desirable option.

Thus, this invention focuses on mechanisms to utilize uplink subframe or carrier to perform RIBS for inter-operator.

To handle various scenarios along with potential eIMTA, it would be desirable to utilize subframe #2 for TDD operation. This may have impact on UE uplink transmission. However, this may be addressed by approach where once at least one eNB is synchronized in a frequency by utilizing another eNB in different frequency (i.e., after initialization), maybe timing update would not be occurred any further or timing update would be occurred with very low frequency such that the impact on UE uplink transmission can be endured.

In terms of information may need to be carried on discovery signal is as follows: (i) stratum level, (ii) whether this can be used for time synchronization only, frequency synchronization only or usable for both, (iii) source cell type (macro, HeNB, pico, etc)—this may not be needed if (ii) is provided and restriction on RIBS-RS is not given by cell type, and (iv) muting/transmission pattern (if not predetermined), etc.

Besides, a coordinated muting and transmission pattern should also be determined such that each eNB knows when to transmit radio-interface based synchronization reference signal (RIBS-RS) and when to listen on RIBS-RS.

One simple design of determining transmission timing is to prefix the interval or periodicity of RIBS update. For example, let's assume that 10 seconds is an interval of two consecutive coordinated muting/transmission. It can be assumed that clock source or stratum level '0' can start its transmission at first SFN in every 10 seconds (i.e., SFN % 10000=0) where a eNB synchronizes itself using clock source or stratum level '0' can transmit signal at second SFN in every 10 seconds (i.e., SFN % 10000=1) and so on.

To be able to detect stratum level, instead of using cell ID, stratum level can be used for RIBS-RS scrambling such that stratum level 0 uses cell ID=504 and stratum level 1 uses cell ID=505 and so on.

To support this, instead of transmitting only PSS/SSS/CRS, PSS/SSS/SSS/CRS or PSS/PSS/SSS/CRS can be transmitted where PSS carries 3 IDs and SSS can carry 158 IDs. If PSS/SSS/SSS is used, the second SSS may carry only around 6 IDs in total. If additional PSS is used, the stratum level may be fixed to 2 or another PSS can be used as well. If this is used, the gap between PSS/SSS can be different from FDD or TDD gap such that a UE may not be able to detect this RIBS-RS PSS/SSS.

Another approach to carry stratum level is to use the gap between PSS/SSS where the cell ID is fixed to a number which may be agreed among operator not used for actual cell ID and reserved for RIBS, and then the gap between PSS/SSS can be used as stratum level. When PSS/SSS offers sufficient time/frequency tracking, CRS transmission may not be necessary. Otherwise, CRS-like RS transmission additionally can be considered.

Another example is to use PRS with $V_{shift}$ implying stratum level. If this is used, up to stratum level 6 can be conveyed via PRS. In this case, to separate from actual PRS transmission, the cell ID used for PRS can be different from normal cell ID operation.

When shared cell ID is used, it is possible that there are more than one cells in a specific stratum level and thus multiple transmission of RIBS-RS from multiple cells are experienced which may degrade the performance of network synchronization. To minimize the collision and thus improve the performance, it can be considered to use "CRS" or "PRS" in addition to PSS/SSS with Vshift where Vshift is selected based on physical cell ID or randomly so that collision between cells with the same stratum level can be minimized.

To allow UL→DL switching time, it may be assumed that last OFDM symbol is not used for RIBS-RS transmission if uplink subframe is used. Also, for DL→UL switching, first symbol may not be used either.

FIG. 9 briefly describes an example of RIBS-RS formation among different frequency cells. Referring to FIG. 9, muting and transmission pattern may be determined based on SFN and the interval of network listening.

For example, if the interval is 10 seconds, each clock source according to its SFN, transmits RIBS-RS at the first SFN in every 10 seconds. Since other adjacent carrier may also perform network listening, once discovered that RIBS-RS is transmitted by adjacent carrier, muting to protect RIBS-RS transmission in adjacent carrier can be also considered.

Since, this may increase the overhead or unusable uplink subframes, in terms of determining transmission point per stratum level, instead of sequential transmission, intermittent transmission may be desirable.

FIG. 10 briefly describes an example of RS transmission point based on the stratum level. Referring to FIG. 10, RS transmission point may be determined based on the stratum level. In other words, if the stratum level is higher, the RS transmission cycle is shorter.

For example, in the example of FIG. 10, maximum stratum level is 3. For transmission cycle, RS of stratum level 0 is transmitted per 1 RS cycle, RS of stratum level 1 is transmitted per ½ RS cycle, RS of stratum level is transmitted per ¼ RS cycle, and RS of stratum level 3 is transmitted per ⅛ RS cycle in the example of FIG. 10.

To determine whether the RIBS-RS can be used for both time and frequency synchronization, separate RIBS-RS transmission also can be considered. For example, PSS is used for time synchronization and SSS is used for frequency synchronization.

When both PSS and SSS are present, target eNB may assume that time and frequency synchronization using the RIBS-RS can be achieved.

To convey stratum level, however, each signal may be scrambled with stratum level or cell ID which represents stratum level. Alternatively, different sequence or scrambling used for time and/or frequency synchronization can be also considered.

For example, PSS/SSS is used for both time and frequency (along with CRS potentially), then the sequence generation (such as root index) can be different between time or frequency synchronization such that a eNB may need to read both PSS/SSS to be able to perform time and frequency tracking where stratum level can be carrier per each PSS/SSS pair.

For example, two subframes can be used to deliver two PSS/SSS pairs where each pair is used for time and frequency respectively. For frequency tracking, source cell type (to represent the accuracy of frequency error or stability) can be embedded to the sequence so that the target eNB may acquire RIBS-RS with better frequency stability as a candidate source in addition to SINR (or quality of signal) and stratum level.

When a combined signal is used for both time and frequency synchronization, means to convey the source cell type could be necessary. One example is to assign cell ID per source cell type so that each eNB can infer the source cell type by detecting cell ID. Or, in terms of determining ID used for RIBS-RS, a combination of source cell type, stratum level, (and frequency stability/accuracy) can be considered such that by reading RIBS-RS, each eNB can detect the stratum level source cell and source cell type.

It is also notable that a eNB which is not synchronized may not transmit RIBS-RS. Otherwise, the state information whether the eNB is synchronized or not should also be carried out in RIBS-RS transmission. Assuming only synchronized eNB transmits RIBS-RS, it is desirable that RIBS-RS would be different from legacy signals such that by detecting RIBS-RS, each eNB can assume that the transmitter is already synchronized.

When an eNB cannot find any source cell to perform network synchronization for a certain timeout duration, it can be considered that the eNB claims itself as a clock source (or virtual clock source). The sequence of virtual clock source could be different from actual clock source such that by detecting virtual clock source signal, neighboring cells can detect the issue.

Neighboring cell may increase the transmit power to cover "unreachable" eNBs. Thus, regardless of cell state in terms of synchronization, it is desirable to transmit some signals so that neighboring cells can detect it. For that, either used for virtual clock source or "asynchronous" eNB, or "asynchronous" due to maximum stratum level, an ID can be reserved in terms of RIBS-RS generation. Since this asynchronous eNB may not be aware of muting pattern, it may transmit RIBS-RS more frequently (e.g., in every SFN) so that it can be heard by other eNBs.

For efficient network operation, those asynchronous eNBs may not serve any UE until the synchronization issue is addressed. It can be further assumed that each clock source or there is a master eNB per carrier/frequency which will be in charge of monitoring "asynchronous" eNBs. Since backhaul signalling between eNBs in a same frequency or operated by the same operator is feasible, those information can be propagated via backhaul signalling and proper management can be performed.

If this is considered, another alternative approach of handling inter-operator scenario is that only master eNBs are synchronized each other via inter-frequency network listening and network listening for other eNBs can be performed via intra-frequency/intra-operator operation.

Assuming those mater eNBs are GPS-equipped, only information that each master eNB needs to align may be SFN and DL/UL configuration information. This would be achieved by cell discovery where each eNB may listen on different frequency to discover SFN and DL/UL configuration information which will be constant across cells in the same frequency.

If those master eNBs may not be equipped with GPS, the master eNB may listen on different frequency to acquire synchronization and be a clock source for the operating frequency. This may however degrade the performance of network synchronization depending on the stratum level that this master eNB acquires. Thus, if there is not master eNB which is a clock source in a frequency, it is desirable for each eNB tries different frequency for network listening. Even there is a master eNB which is a clock source, to acquire network synchronization with lower stratum level, it would be necessary to listen on different frequency as well.

Overall, to avoid confusion and many cases/frequencies to look up, it is also considerable to have a dedicated frequency where each clock source and source cells transmit RIBS-RS regardless of its operating frequency. For example, in a frequency band, if there are four carriers/frequencies (f1, f2, f3 and f4), a dedicated operating frequency for RIBS can be f2 or f3 such that all eNBs can listen on only one frequency for performing network listening.

Each eNB at transmission instance may transmit RIBS-RS in that dedicated frequency. To handle frequency switching and potentially DL-UL switching, the gap can be considered. Since, the dedicated frequency can have performance impact, it can be changed periodically. When this approach is used, clock source may need to align SFN via listening each other or by other means.

FIG. 11 briefly shows an example of the gap between synchronization signals which can be used for stratum level. Referring to FIG. 11, each PSS and SSS at predetermined subframe is corresponding specific stratum level.

To be able to transmit CRS, it is desirable not to transmit SSS in OFDM symbol with CRS transmission. To convey other stratum level, the reverse gap (i.e., switching PSS and SSS position) can be also considered.

Since, to listen on other frequency, in addition to DL/UL switching, frequency switching latency is needed. Thus, if uplink is used, it can be also assumed that UpPTS in prior to uplink transmission may not be utilized either. UpPTS is an uplink parts of a special subframe which comprises uplink parts, guard period (GP), and downlink parts (DwPTS). If further gap is needed, guard period can be utilized.

Also, for a gap to switch to DL frequency, a few OFDM symbols may not be utilized for RIBS-RS transmission. Overall, it would be desirable to utilize first slot only. Particularly, for PSS/SSS transmission (if used for RIBS-RS), it may be transmitted in first slot rather than second slot to allow frequency switching latency.

When a eNB hears (even though it may not synchronize itself against the transmitter)

RIBS-RS transmission in any frequency, it may perform muting at subframes which will be used for RIBS operation in that frequency. For example, an eNB hears RIBS-RS with stratum level 2 at frequency f2 at SFN=4, it can compute the muting pattern used for f2 such as SFN=3 for stratum level 1, SFN=5 for stratum level 3 and so on. By computing those subframes, this eNB may perform muting at those places to support better hearability at f2 network listening.

Other possibility is to convey muting/transmission SFN or muting/transmission subframes in a data channel (such as new SIB used for RIBS or new PDCCH used for RIBS) such that other eNBs can obtain the list of muting subframes. This channel can be also used to convey the source cell type.

Furthermore, such as PBCH-like channel can be considered to propagate the essential information related to network listening without backhaul signaling support. This channel may carry, maximum stratum level that the clock source supports, SINR threshold per hop, muting/transmission pattern, DL/UL configuration, SFN, and so on.

If PBCH is transmitted by the clock source, this may be relayed by other source cells or each source cell may generate another PBCH-like channel to convey the information. If PBCH-like channel is transmitted, this may be transmitted in the second slot of transmission subframe similar to current PBCH transmission. In terms of cell ID to scramble the PBCH, the same ID used for RIBS-RS can be used or if cell ID for clock source is predetermined (or at least a set of possible cell IDs are known to eNBs), actual cell ID can be utilized for that as well.

If PBCH-like channel is transmitted, this can be used for aligning SFN and DL/UL configuration. Accordingly, it is possible that different clock source may propagate different SFN or UL/DL configuration information. When this is occurred, each eNB may follow (or prioritize) the configuration in the same frequency where the eNB operates rather than performing network listening. This implies that regardless of stratum level, the configuration when discovered in a frequency may be aligned.

Thus, when a eNB uses different frequency to perform network listening, the eNB may not listen on PBCH-like channel in that frequency.

Or, it can be further considered (to align SFN and DL/UL configuration across frequencies) to have a priority list where each clock source may listen on other frequency according to the priority list to acquire SFN and DL/UL configuration information. As each clock source may not be hearable each other, this may be achievable only when the network synchronization is performed involving other eNBs. Thus, before acquiring SFN & DL/UL configuration from the higher priority frequency, clock source may not progagate the SFN/DL&UL configuration information. In other words, each eNB may listen on PBCH in different frequency from the frequency where network listening has been occurred.

In terms of muting pattern, it can be also considered that legacy PBCH or SIB may carry the information such that each eNB first discovers the clock source (by reading PSS/SSS and potentially PBCH and/or SIB). In SIB transmission of clock source, the muting pattern and the necessary information for RIBS operation (such as resource, muting pattern, RIBS-RS type, maximum stratum level, threshold, etc) can be included. This would require eNB needs to discover the cells first.

If this is used, legacy signals can be used for RIBS-RS such as PSS/SSS/CRS. Furthermore, if this is used, stratum level can be also carried in SIB transmission. It is however difficult to perform coordinated muting as normal PSS/SSS may not be muted without impact on legacy UEs.

However, this can be used along with such as CSI-RS where CSI-RS is used for RIBS-RS after each cell detect other cells via detecting PSS/SSS/CRS and also potentially PBCH/SIB. CSI-RS (RIBS-RS) can be transmitted in guard period or via MBSFN configuration where the position of CSI-RS (in either frequency or time domain) can be interpreted as stratum level. In other words, RIBS-RS can be used in a same manner used for intra-frequency for which X2 signalling (backhaul signalling) can be used or same operator scenario. To overcome the issue of backhaul signalling, SIB or PBCH transmission from each cell can be utilized to convey the necessary information if OAM is not feasible.

One issue with this approach is to handle cell on/off where PBCH or SIB may not be transmitted all the time. Thus, each eNB (which is asynchronous) may transmit signal which requests transmission of PBCH or SIB (the necessary information for RIBS operation) via air interface if it cannot detect it for a timeout. Upon receiving the request, the neighboring cell may transmit the necessary information.

Another issue in terms of transmitting additional information via PBCH or SIB is the impact on UEs. This may have performance impact on UEs. To minimize the impact, only essential information may be carried (such as a muting pattern).

Note that the techniques mentioned this disclosure can be applicable to inter-operator network listening scenarios also where backhaul signalling may not be feasible. More specifically, SIB/PBCH based approach or RIBS-RS based approach can be applied to inter-operator scenario without loss of generality.

For inter-operator scenario, a simple extension of SIB/PBCH can be further considered. One example is to transmit "indication of clock source" in SIB1 or SIB2 or PBCH. In other words, only the clock source from different operator can be used as a source cell for cell in one operator if the cell cannot find any other clock source or source cell in the same operating frequency.

To indicate the clock source, the clock source may transmit "indication of clock source" in SIB or PBCH so that another cell can discover the clock source in different frequency. Once a cell achieves the synchronization from inter-operator frequency, the cell can be a source cell for its operating frequency.

FIG. 12 briefly describes an example of synchronization procedure explained above. Referring to FIG. 12, clock source-operator transmits RIBS-RS and SIB including clock source indication to cell 1 and cell 2. Cell 1 and cell 2 are synchronized with clock source-operator A using RIBS-RS from clock source-operator A. Then, cell 1 becomes a source cell transmitting RIBS-RS. Cell 3-operator B synchronizes with cell 1 using RIBS-RS from cell 1.

Inter-operator network listening may not be needed, at least one clock source/source cell from the same operator is present in one eNB's vicinity. In other words, inter-operator network listening would be needed when one eNB cannot find any other cell by intra-operator network listening or may not be able to synchronize by intra-operator listening.

This means that if at least one eNB can be synchronized by another eNB of different operator, the eNB can be a source cell which can be used for intra-operator network listening. In this regards, indication of clock source can be more useful if added to SIB.

An eNB which receives SIB from clock source can be synchronized to it and become source cell itself. The synchronization can be propagated in its operator band using intra-operator network listening schemes discussed in 3GPP TS 36.212. However, it should be noted that this also has its limitation in that only clock source can be shared between different operators.

FIG. 13 is a flow chart briefly describing the operation of the inventions explained above.

Referring to FIG. 13, the cell, which is woke up and need to synchronize, receives signal (S1310). The received signal may include information indicating signalling timing for a reference signal which can be used in network synchronization as described before. The reference signal for synchronization may be one of CRS, CSI-RS, PSS and/or SSS, DM-RS, RIBS-RS and MBSFN-RS.

The signals may be transmitted by SIB or via air interface. The SIB may include information on stratum level of a source cell.

The reference signal for synchronization may be transmitted repeatedly from the source cell when stratum level of the source cell is high. The number of repeated transmission of the reference signal for synchronization may be increased according to stratum level of the source cell getting higher.

In addition, signals of a subframe, at which the reference signal for synchronization is transmitted from the source cell, may be muted except the reference signal for synchronization from the source cell. A pattern of muting may be transmitted from the source cell by being included in system information.

The cell may perform synchronization using the received signal (S1320). The cell may synchronize to the source cell using the reference signal one of CRS, CSI-RS, PSS and/or SSS, DM-RS, and MBSFN-RS. The cell may perform synchronization considering stratum level. The detailed operations of synchronization are same as described before.

The cell may receive and/or data with the synchronized timing (S1730). When the synchronization is completed, the cell may transmit reference signal to the other cell such that the other cell may synchronization using the reference signal.

The more detailed operation of the cell is same as described before.

FIG. 14 is a block diagram which briefly describes a wireless communication system including a first BS (eNB) 1400 and a second BS (eNB) 1440.

The first BS 1400 and the second BS 1440 may operate based on the description as explained above. For example, the first BS 1400 may be a BS which woke up and needs to synchronize with source cells. In other words, the first BS 1400 may be a BS to perform network synchronization. The second BS 1840 may be a source cell which may transmit signal needed for synchronization to the first BS 1400.

The first BS 1400 may be a small cell and the second BS 1440 may be a macro cell.

The first BS 1400 comprises a processor 1410, a radio frequency (RF) unit 1420, and a memory 1430.

The processor 1410 performs network synchronization process described above. For example, the processor 1410 may perform network synchronization using reference signal such as at least one of CRS, CSI-RS, PSS and/or SSS, DM-RS, RIBS-RS and MBSFN-RS. The detailed process performed by processor 1410 is same as described above.

The RF unit 1420 may receive signals including system information block (SIB), reference signal for synchronization such as one of at least one of CRS, CSI-RS, PSS and/or SSS, DM-RS, RIBS-RS and MBSFN-RS, etc. The SIB may include information indicating stratum level.

The RF unit 1420 may receive and/or transmit signals at the synchronized timing.

The memory 1430 may store information and data needed for synchronization and wireless communication.

The second BS 1440 may include a processor 1450, a RF unit 1460, a memory 1470.

The processor 1450 performs what described in this disclosure for network synchronization process. For example, the processor 1450 may indicate its own stratum level by the signal through the RF unit 1460. In addition, the processor 1450 may construct reference signal for the synchronization.

The processor 1450 may determine how often or how many the signal is transmitted repeatedly. The determination may be performed based of the stratum level. The more detailed operation of the processor 1450 is same as described before.

The RF unit 1460 may signals including system information block (SIB), reference signal for synchronization such as one of at least one of CRS, CSI-RS, PSS and/or SSS, DM-RS, RIBS-RS and MBSFN-RS, etc.

The RF unit 1460 may transmit signal repeatedly based on the stratum level which corresponds to accuracy.

The memory 1470 may store information and data needed for synchronization and wireless communication.

The more detailed descriptions for the BS s are same as described before with or without figures.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, the above-described embodiments include various aspects of examples. Accordingly, the present invention should be construed to include all other alternations, modifications, and changes which fall within the scope of the claims.

In the description regarding the present invention, when it is said that one element is "connected" or "coupled" to the other element, the one element may be directly connected or coupled to the other element, but it should be understood that a third element may exist between the two elements. In contrast, when it is said that one element is "directly connected" or "directly coupled" to the other element, it should be understood that a third element does not exist between the two elements.

The invention claimed is:

1. A method for performing a synchronization by a small cell based on network listening, the method comprising:

waking up, by the small cell, by detecting a macro frequency;

determining, by the small cell, whether or not the synchronization with an external source can be performed;

if it is determined that the synchronization with the external source cannot be performed, searching for, by the small cell, a macro cell;

determining, by the small cell, whether or not the searched macro cell is an overlaid macro cell to perform the synchronization by receiving a reference signal and system information including information on a stratum level of the searched macro cell;

if the searched macro cell is determined as the overlaid macro cell, performing, by the small cell, the synchronization to the detected macro cell based on the system information and the reference signal for the synchronization;

if the overlaid macro cell is not detected, searching, by the small cell, a next frequency to locate any synchronization source, and performing the synchronization, wherein the synchronization is performed on a different frequency if a center frequency is different, and the synchronization is performed on same frequency if the center frequency is same; and receiving or transmitting, by the small cell, data at a timing based on the synchronization, wherein the reference signal is received via an air interface.

2. The method of claim 1, wherein the reference signal for synchronization is transmitted repeatedly from the detected macro cell when the stratum level of the detected macro cell is high.

3. The method of claim 2, wherein a number of repeated transmission of the reference signal for the synchronization is increased as the stratum level of the detected macro cell becomes higher.

4. The method of claim 1, wherein signals of a subframe, at which the reference signal for the synchronization is transmitted from the detected macro cell, are muted except the reference signal for the synchronization from the detected macro cell.

5. The method of claim 4, wherein a pattern of muting is transmitted from the detected macro cell by being included in the system information.

6. The method of claim 1, wherein the reference signal for the synchronization is a radio-interface based synchronization reference signal.

7. An apparatus for performing a synchronization based on network listening, the apparatus comprising:
a radio frequency (RF) unit configured to transmit and receive a radio signal; and
a processor operatively coupled to the RF unit, wherein the processor is configured to:
transmit signals via the RF unit based on a scheduling for uplink (UL) or downlink DL),
wake up by detecting a macro frequency,
determine whether or not the synchronization with an external source can be performed,
if it is determined that the synchronization with the external source cannot be performed, search for a macro cell,
determine whether or not the searched macro cell is an overlaid macro cell to perform the synchronization by receiving a reference signal and system information including information on a stratum level of the searched macro cell,
if the searched macro cell is determined as the overlaid macro cell, perform the synchronization to the detected macro cell based on the system information and the reference signal for the synchronization,
if the overlaid macro cell is not detected, search a next frequency to locate any synchronization source, and performing the synchronization,
wherein the synchronization is performed on a different frequency if a center frequency is different, and the synchronization is performed on same frequency if the center frequency is same, and
receive or transmit data at a timing based on the synchronization,
wherein the reference signal is received via an air interface.

8. The apparatus of claim 7, wherein the reference signal for the synchronization is transmitted repeatedly from the detected macro cell when the stratum level of the detected macro cell is high.

9. The apparatus of claim 8, wherein a number of repeated transmission of the reference signal for the synchronization is increased as the stratum level of the detected macro cell becomes higher.

10. The apparatus of claim 7, wherein signals of a subframe, at which the reference signal for the synchronization is transmitted from the detected macro cell, are muted except the reference signal for the synchronization from the detected macro cell.

11. The apparatus of claim 10, wherein a pattern of muting is transmitted from the detected macro cell by being included in the system information.

* * * * *